Nov. 6, 1923. 1,473,491
F. W. MANNING
METHOD AND APPARATUS FOR TREATING MATERIALS FOR FILTERING,
DECOLORIZING, AND SIMILAR PURPOSES
Filed Oct. 6, 1922
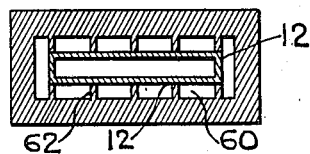
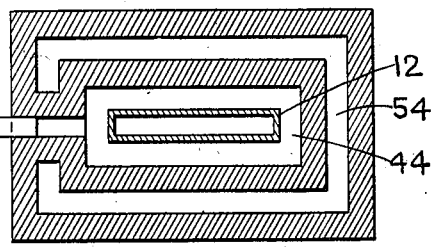
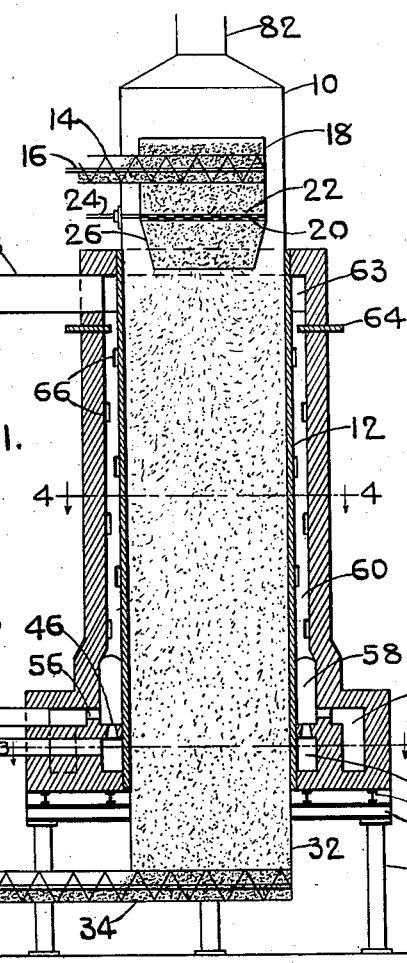
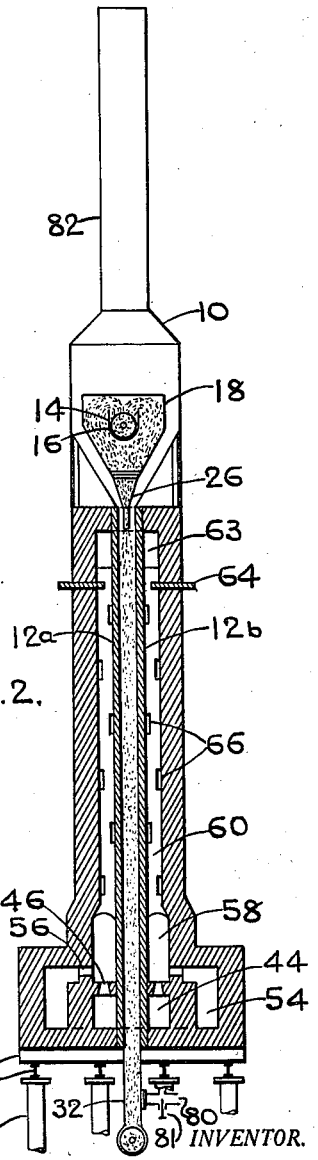
INVENTOR.
Fred W. Manning Patented Nov. 6, 1923.

1,473,491

UNITED STATES PATENT OFFICE.

FRED W. MANNING, OF BROOKLYN, NEW YORK, ASSIGNOR TO MANNING REFINING EQUIPMENT CORPORATION, A CORPORATION OF DELAWARE.

METHOD AND APPARATUS FOR TREATING MATERIALS FOR FILTERING, DECOLORIZING, AND SIMILAR PURPOSES.

Application filed October 6, 1922. Serial No. 592,907.

*To all whom it may concern:*

Be it known that I, FRED W. MANNING, a citizen of the United States, residing in Brooklyn, in the county of Kings and State of New York, have invented certain new and useful Improvements in Methods and Apparatus for Treating Materials for Filtering, Decolorizing, and Similar Purposes, of which the following is a specification.

The present invention relates to a method of and apparatus for preparing materials suitable for filtering, decolorizing, or removing undesired substances from liquids, gases or other fluids, and for revivifying or increasing or restoring the filtering or decolorizing power of spent materials of this type. More particularly, the invention relates to a method and apparatus for revivifying or restoring finely divided fuller's earths, bone char, activated carbons, carbon surrogates and similar natural or artificial materials after use in decolorizing, clarifying or otherwise purifying liquors, such as sugar liquors, syrups, oils, fats, and solutions of various kinds.

In revivifying purifying agents of this type, it is customary to heat the spent or exhausted material to a rather high temperature to volatilize and destroy the organic matters taken up from the liquids purified thereby. It is desirable, but difficult, to couple this heating with a certain amount of oxidation to prevent, or obviate the effects of, deposition of carbon by charring. In this operation an accurate control of temperature is desirable, since a temperature which is too low does not suffice to effectively volatilize or otherwise remove the substances which clog or impair the activity of the material, while too high a temperature, in the case of earthy materials, tends to shrink, sinter or fuse the particles and thus impair their activity and value, or, in the case of carbon materials, tends to cause the formation of inactive carbon. With oxidation there is a tendency for it to become too active with consequent loss of material. When the treatment is carried on in the customary manner in retorts or muffles with the material in contact with the heated walls of the retort or treating chamber during the heating, an even heating is very difficult to obtain, since those portions of the material in direct contact with the heated wall of the treating chamber are heated to a higher temperature than those more remote from the source of heat. Granular or pulverulent materials of this kind are not good conductors of heat. Consequently, portions of the material are frequently overburned or under treated, particularly when the range of temperatures for proper treatment is narrow and the material is particularly sensitive to temperatures outside of the proper temperature limits. A uniform distribution of treating or oxidizing gases is also more difficult to obtain when the material is heated in large masses or aggregates, particularly when the material is in a very finely divided condition. In treating finely divided materials in the presence of swiftly moving flame gases a further difficulty may be encountered in large loss of material carried away by the treating gases.

It is the object of the present invention to provide a method and apparatus by which materials of the above character may be more rapidly and economically treated and in which the temperatures at different periods of treatment may be modified and controlled and in which finely divided materials may be treated without excessive loss. To this end I drop the material through a narrow hot-walled chamber containing an atmosphere of appropriate composition, the particles being heated by radiation from the walls and by the gas mass, while falling. In so doing, while the materials are treated en masse, yet each individual particle of material is really individually heated and treated. In its process aspect, my invention resides in heating and treating materials of the class described, for activation and revivification in a state of free fall; and in its apparatus aspect, my invention relates to suitable means for effecting such a heating in such a way. I provide an externally heated, vertical retort or shaft through which the material is dropped; sealed means being provided for introducing the granular or pulverulent material into the top of the retort and means being provided at the bottom for removing the material there accumulating. Suitable firing means are provided for heating the retort or shaft member, In such a method and with such an apparatus, it is not desirable that any individual particle be very far from the hot wall of the retort; the retort must be narrow in one diameter, although not necessarily so in others.

The various features of the invention are illustrated in the accompanying drawings in which:

Fig. 1 is a sectional elevation of a furnace and treating shaft embodying an advantageous form of the invention, Fig. 2 is a vertical section of the furnace and shaft taken at right angles to the section of Fig. 1, Fig. 3 is a section of the furnace and shaft taken on the line 3—3 of Fig. 1, and, Fig. 4 is a section of the furnace and shaft taken on line 4—4 of Fig. 1.

In the present invention the finely divided material to be treated is dropped through a narrow vertically arranged shaft extending through and heated by a suitable furnace. In passing through the shaft, the particles of material are heated by radiation from the walls of the shaft and by heat taken up from the gaseous medium within the shaft but are without direct contact with the heated walls to any considerable extent. The shaft is advantageously of a narrow cross-section to afford a short path for the radiation of heat to the particles and the scattering or distribution of the particles in the upper part of the shaft takes place in a corresponding narrow area or zone.

The furnace is so arranged as to provide a long, slow burning flame of moderate and evenly distributed temperature. To this end, it is advantageous to use a liquid or gaseous fuel and burn it with what may be termed diluted air; air containing a certain amount of products of combustion. The presence of the products of combustion gives an elongated flame of the type desired. For this purpose a portion of the products of combustion may be returned and mixed with the air and with the fuel entering combustion. The furnace surrounding the shaft is also preferably divided into vertical flues provided with suitable dampers by which the flame and flame gases may be distributed around the shaft to obtain a uniformly distributed heating effect. The shaft is advantageously provided with an extension depending below the furnace to permit a cooling of the treated particles after passing through the heated portion in the furnace. Various gases or gas mixtures may be introduced into the shaft to obtain an atmosphere of the type desired.

Referring more particularly to the accompanying drawings, the material to be treated is introduced through a hood 10, positioned over a treating shaft 12, by means of a feed pipe 14 and a screw conveyor 16 or other feeding means and is received in a distributing hopper 18 which opens downwardly into the upper part of the shaft 12. From the feed pipe 14 the material is supplied to the hopper and is distributed and fed downwardly from the hopper in a loose condition by means of a stationary grate or grid 20 extending across the hopper and a movable grate 22 above the grade 20 and reciprocated thereon by means of a rod 24 extending outwardly through the wall of the hood 10. From the grates 20 and 22, the loose material falls freely through a narrow spout 26 of appropriate shape into the upper end of the shaft 12.

The cross section of the shaft 12 is slightly larger than that of the spout 26 which permits the material fed from the spout 26 to fall freely without substantial contact with the walls of the shaft. The side walls 12$^a$ and 12$^b$ of the shaft are spaced quite close to each other to form a narrow passage. To avoid a too rapid cooling of the particles after their removal from the shaft and to guard against bringing the hot treated material into contact with air upon its removal from the shaft, the shaft may be extended below the furnace, as at 32, to permit a partial cooling of the particles in their freely suspended, falling movement. The treated particles are removed from the bottom of the shaft through an outlet 34 by means of a screw conveyor 36 or other suitable means.

In the embodiment of the invention illustrated in the accompanying drawings, the furnace is heated with gas. The gas is supplied through a supply pipe 38, control valve 40 and pump or booster 42 to an annular distributing box 44 opening into the shaft 12. From the distributing box 44, the gas passes upwardly through a number of ports or nostrils 46 suitably spaced about the shaft 12. Air for supporting combustion is supplied through a supply pipe 48, regulating valve 50 and pump 52 to an annular distributing box 54 surrounding and extending above the gas distributing box 44. The air is directed through a number of outlets or nostrils 56 in the box 54 and the gas nostrils and the air outlets are so arranged as to be located opposite one another and each pair is located centrally under a heating flue 60. The mixture of air and gas is ignited in chamber 58 surrounding the shaft 12 and the burning gases and products of combustion pass upwardly through flues 60 formed about the shaft 12 by vertical partition walls 62 extending up to collecting flue 63.

The flame and flame gases are so distributed about the shaft 12 as to provide a uniform temperature about the walls of the shaft. To enable this distribution to be more readily controlled and any inequalities in temperature to be corrected, each of the flues 60 is provided with a damper 64 preferably positioned in the upper part of the flue, and the partition walls 62 are provided with openings 66 through which burning gases and products of combustion may be diverted from one flue to an adjacent flue by a suitable adjustment of the positions of the dampers 64. From the upper part of the furnace or collecting flue 63 products of combustion pass out through an outlet flue 68 past a controlling damper 70.

In treating the material passing through the shaft 12 it is desirable to avoid any hot spots or zones in the shaft and furnace and to distribute an even heating effect over a considerable length of the shaft. To this end, the furnace is operated to produce a long flame of moderate intensity, advantageously by diluting either the air or the gas, or both, entering into combustion with a suitable inert or diluting gas. For this purpose, a portion of the products of combustion in flue 68 may be diverted by a branch pipe 72 and pass to the gas inlet pipe 38 and by a branch pipe 74 to the air supply pipe 48. The relative proportions of the products of combustion passing through the pipes 72 and 74 to the gas and air supply pipes is controlled by dampers 76 and 78 in the pipes 72 and 74, respectively.

In treating, preparing or revivifying some materials, it may only be necessary to maintain them at the proper temperatures for a sufficient time to volatilize or decompose and remove impurities which obstruct their activity. With other materials, a slight oxidizing action is desirable. In the latter case, steam, carbon dioxide, or mixtures of steam, carbon dioxide, air or other suitable mixtures may be admitted to the lower part of the shaft 12 by means of an inlet or supply pipe 80 and control valve 81 and pass upwardly in contact with the downwardly falling particles of material to be treated going to exit at 82. When only a slight oxidizing action is desired, it is advantageous to effect it by the presence of carbon dioxide or water vapor. Both have an oxidizing action on carbon, but as this action is endothermic, it cannot cause local overheating. In some cases a reducing or inert atmosphere may be used.

The flow of gases through the heating shaft has another effect in that it opposes the falling movement of the particles, which are in general quite fine, giving what may be termed a retarded fall instead of a free fall. By suitable regulation of the rate of supply of gases to the shaft, the time of treatment of the material, that is the time during which it is falling through the heated zone, may be regulated within limits. The greater the rate of flow of the gases, the greater is the resistance offered to the fall of the particles and the longer is the time of treatment.

As the material treated is ordinarily quite fine, the buoying effect of even a moderate flow of gas through the narrow conduit offered by the shaft is considerable. As the cross section of hood 10, above hopper 18, is considerably greater than that of the shaft, the speed of gas flow is there retarded, allowing entrained particles to settle out. Mostly they collect in hopper 18. In the event that an extremely light material is being treated which tends to float out of the hood with the exhaust gases a preciptator of the electrical or other suitable type may be used.

The shaft 12 may be constructed of any suitable material the walls being sufficiently thin to permit a rapid transfer of heat. The shaft and furnace may be supported on posts 84 and beams 86 or other suitable supporting structure.

The operation of the apparatus and method is briefly as follows: Material to be treated, preferably in the form of particles of uniform fineness, is supplied through the supply pipe 14 by the conveyor 16 to the hopper 18 and is distributed through the grates 20 and 22 in a loose condition to the spout 26 and to the upper part of the stack 12. The particles of material are thus dispersed evenly throughout the cross-sectional area of the shaft and fall therethrough without substantial contact with the heated walls of the shaft. The thin stream of material in free fall (or in retarded fall, as the case may be) is subjected to the heat radiated and transferred from the walls of the shaft, the individual particles receiving heat directly from the shaft walls as well as from the atmosphere of gases through which they fall. The impurities are thereby volatilized or decomposed and driven out of the material or oxidized by the gases introduced through the pipe 80. The treated material then passes through the unheated portion of the shaft and is removed through the pipe 34.

The shaft is heated by means of fuel gas supplied through the pipe 38, distributing box 44 and ports 46 and air supplied through pipe 48, distributing box 54 and ports 56. The burning gases and hot products of combustion are distributed among the flues 60 by means of the dampers 64 and openings 66 and, on reaching the upper part of the furnace, pass out through an outlet flue 68. A portion of the products of combustion are returned through the pipes 72 and 74 to the gas and air supply pipes 38 and 48 and by diluting those gases produce a long flame combustion of the gas. In some cases another portion of the exhaust products of combustion may be used as treating gases in the shaft 12, being returned to 80 by a suitable conduit (not shown).

By means of the above invention, material in a fine state of subdivision may be treated under accurately controlled conditions to give uniform treatment to each particle of the material. By suitable adjustment of the operation of the apparatus, the length of time of treatment, the temperature and other conditions may be controlled to suit the requirements of a large variety of materials of the class described.

My method and apparatus are particularly suitable for the treatment of finely divided fuller's earth, such, for example, as will pass a 100 or 200 mesh screen; such material being treated either when fresh or after use, that is, for revivification. They are particularly adapted for revivifying such materials after use upon liquids, such as oil, including vegetable and edible oils; and my invention is particularly applicable in revivifying fuller's earth after use in finely divided state in decolorization and purification of mineral oil, as petroleum or petroleum distillate or product, as described in my application Ser. No. 568,789, filed June 16, 1922.

My method and apparatus are also of particular utility for treating or revivifying bone char or similar material, particularly when in finely divided state, and when such as will pass a 100 or 200 mesh screen, particularly when utilized in connection with sugar and similar solutions or liquids, as described in my application Ser. No. 608,448, filed December 22, 1922.

Having described the invention, what I claim and desire to secure by Letters Patent is:

1. In the revivification and activation of pulverulent purifying agents of the type described, the method which comprises dropping said pulverulent agent through a heated body of gases and in proximity to heated surfaces.

2. In the revivification and activation of pulverulent purifying agents of the type described, the method which comprises dropping said pulverulent agent through a heated body of gases having a limited degree of oxidizing power.

3. In the revivification and activation of pulverulent purifying agents of the type described, the method which comprises dropping said pulverulent agent through a heated body of gases containing products of combustion.

4. In the revivification and activation of pulverulent purifying agents of the type described, the method which comprises dropping said pulverulent agent through a heated body of gases, said body of gases being in upward movement to a sufficient extent to retard substantially the fall of said agent, and while dropping exposing it to radiated heat.

5. In the activation and recovery of fuller's earth, the process which comprises dropping said body through an ascending body of hot gases and in heat-receiving relationship to a heated surface, said body of gases containing components capable of effecting oxidation without development of heat.

6. In apparatus for the activation and recovery of pulverulent purifying agents of the class described, a vertical, externally heated conduit, means for introducing such pulverulent material near the top of said conduit, means for distributing the introduced material as falling particles, means for introducing gases at the base of the conduit and means for removing pulverulent material accumulating in the base of the conduit.

7. Apparatus for treating materials of the character described which comprises a furnace, a substantially vertical shaft casing longer in one dimension than the other in said furnace and centered feeding means for dropping materials into said shaft in a dispersed condition and away from its walls, said casing extending below the heating zone of said furnace to provide a cooling zone for said materials.

8. Apparatus for treating materials of the character described which comprises a substantially vertical shaft casing longer in one dimension than the other, centered feeding means for dropping materials into said shaft to be treated in a dispersed condition and away from its walls, means for externally heating a portion of said casing and means for cooling a portion of said casing below said heated portion.

9. Apparatus of the character described which comprises a furnace, a treating shaft in said furnace, means for providing a long flame in said furnace about said shaft and means for passing materials in a dispersed condition through said shaft.

10. Apparatus of the type described which comprises, a furnace, a treating shaft in said furnace, means for passing materials in a dispersed condition through said shaft and means for supplying diluting gases to the burning fuel in said furnace to produce a long burning flame about said shaft.

11. Apparatus of the type described which comprises, a furnace, a narrow shaft extending through said furnace, a hopper in the upper part of said shaft, means for supplying pulverulent material to be treated to said hopper, a grate through which said material may fall from said hopper into said shaft and means for distributing and controlling the passage of material through said grate.

12. Apparatus of the character described which comprises, a furnace, a shaft extending therethrough, means for dropping materials through said shaft while dispersed through the atmosphere of said shaft, and means for introducing treating gases into said shaft.

13. Apparatus of the character described which comprises, a furnace, a shaft extending therethrough, means for dispersing and dropping material through the atmosphere of said shaft, means for burning fuel about the lower portion of said shaft, means for distributing combustion products from said burning fuel about said shaft, return flues from the upper portion of said furnace to the lower portion of said furnace, and means for distributing the return products of combustion to the air and fuel entering said furnace.

In testimony whereof I affix my signature.

FRED W. MANNING.